J. M. JOHNSON.
COIN ASSORTER AND COUNTER FOR STREET CARS AND OTHER PURPOSES.
APPLICATION FILED APR. 5, 1909.

1,096,171.

Patented May 12, 1914.

J. M. JOHNSON.
COIN ASSORTER AND COUNTER FOR STREET CARS AND OTHER PURPOSES.
APPLICATION FILED APR. 5, 1909.

1,096,171.  Patented May 12, 1914.
5 SHEETS—SHEET 3.

J. M. JOHNSON.
COIN ASSORTER AND COUNTER FOR STREET CARS AND OTHER PURPOSES.
APPLICATION FILED APR. 5, 1909.

1,096,171.

Patented May 12, 1914.

UNITED STATES PATENT OFFICE.

JAY M. JOHNSON, OF CHICAGO, ILLINOIS.

COIN ASSORTER AND COUNTER FOR STREET-CARS AND OTHER PURPOSES.

1,096,171.  Specification of Letters Patent.  Patented May 12, 1914.

Application filed April 5, 1909. Serial No. 487,970.

*To all whom it may concern:*

Be it known that I, JAY M. JOHNSON, a citizen of the United States, and a resident of the city of Chicago, in the county of Cook and State of Illinois, have invented certain new and useful Improvements in Coin Assorters and Counters for Street-Cars and other Purposes; and I do hereby declare that the following is a full, clear, and exact description of the same, reference being had to the accompanying drawings, and to the letters of reference marked thereon, which form a part of this specification.

The requirements of various transportation companies such as street car companies with reference to the manner of collecting fares, has varied through a wide degree. In some instances, the conductor collects and carries the fare until the central station or "barn" or office is reached, when he turns in the money collected. In other instances, a fare box, usually without any counting or recording mechanism whatever, is provided in the car in which the passenger is required to drop the necessary fare. In other instances, the conductor carries a receptacle for the coin and requires the passenger to drop therein the coin for the fare. All these various devices and methods of collecting the fare have proven objectionable and the purpose of any of the same is frequently defeated by the dishonesty or carelessness of the conductor.

The object of this invention is to afford a cash counter or register adapted for installation within the car and operating to show with each fare collected or deposited therein the total amount collected, and, of course, by observing the amount previously recorded indicates also the amount of the fare received, with each deposited.

It is also an object of the invention to afford an exceedingly simple, strong and durable device not likely to get out of order and so constructed as to reduce the device to the utmost simplicity mechanically.

It is furthermore an object of the invention to afford a mechanism of the class described adapted to separate the coin of different denominations, one from the other as they are dropped into the receptacle therefor and to afford a total record of the number of each kind of each coin received during a trip and to deliver the separated coin into separate and appropriate receptacles, thus greatly facilitating the counting of the collection, serving as a check at all times on the conductor, and affording a mechanical device whereby the labor and responsibility of the conductor in the matter of fares is reduced to a minimum.

It is also an object of the invention to afford in connection with a machine of the class described a tray or receptacle in which the coin are exhibited as inserted from time to time until dropped into the appropriate compartments by means of suitable mechanism therefor.

The invention embraces many novel features and consists in the matters hereinafter described and more fully pointed out and defined in the appended claims.

Figure 1:
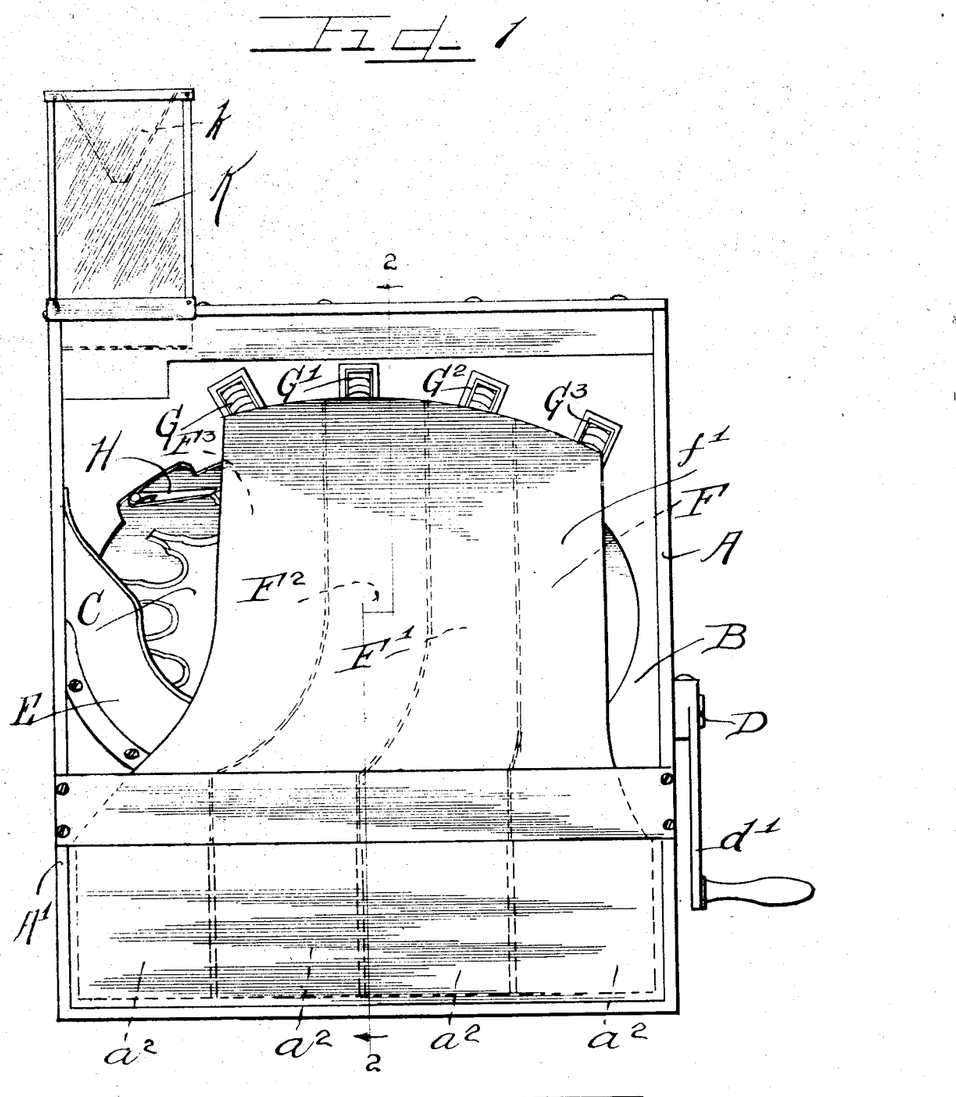
Figure 1 is a front elevation of a machine embodying my invention.
Figure 4:
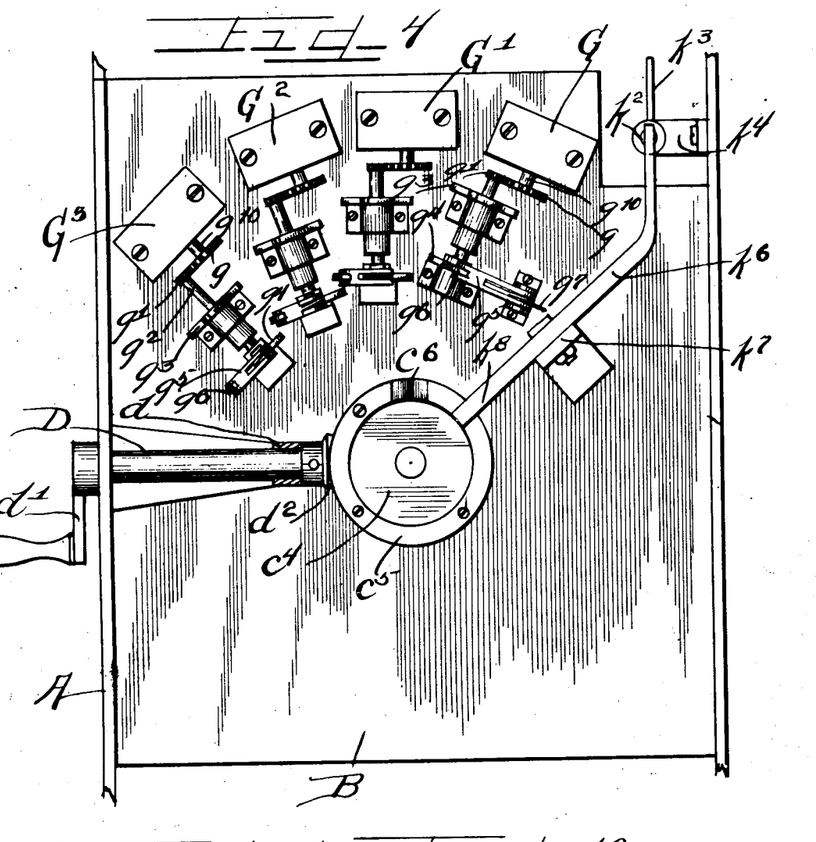
Fig. 4 is a rear elevation thereof showing, however, a part of the frame.
Figure 5:
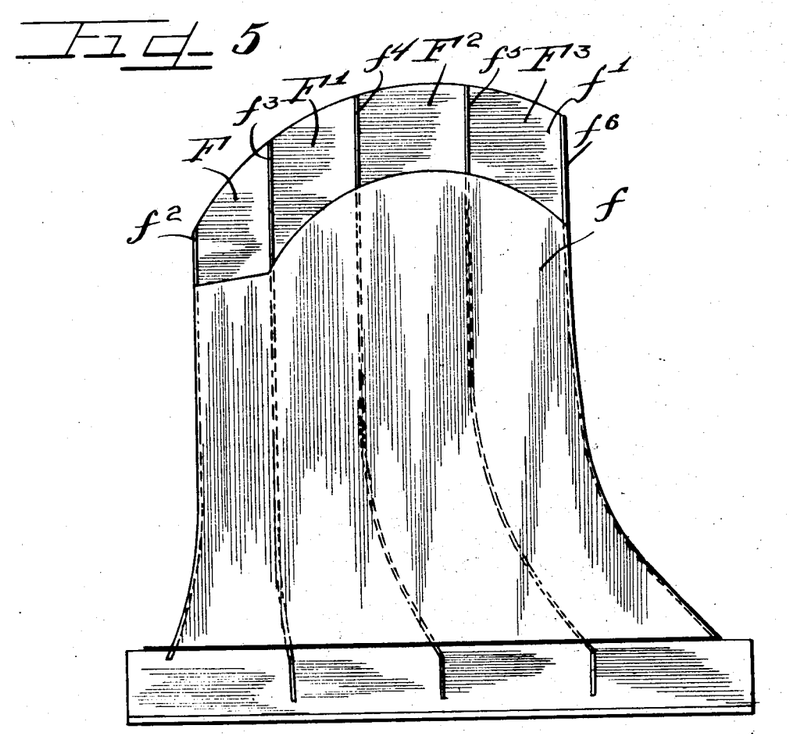
Fig. 5 is a rear elevation of the chute for the different coin.

As shown in said drawings: A frame is constructed consisting of side members A—A', and bottom $a$, and a series of drawers or compartments $a^2$, extending across the face of the machine and rearwardly, and as shown in Figs. 1 and 4, adapted to receive the change or fare after the same has been delivered to the machine.

Figures 8, 9:
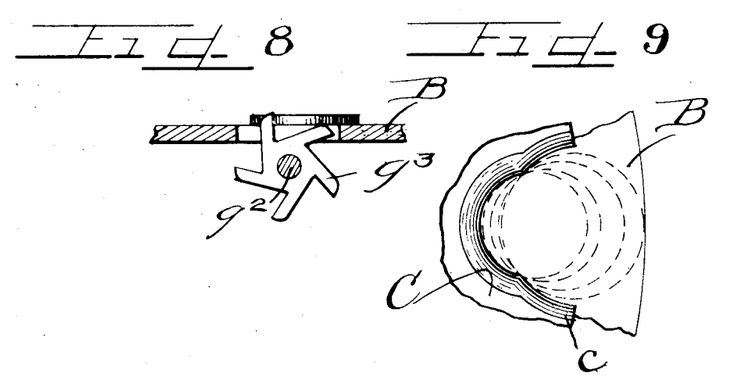
Fig. 8 is an enlarged detail of the trip wheel.
Fig. 9 is a fragmentary detail of one pocket in the carrying wheel and illustrates the carrying capacity for coins of different kinds in each of said pockets.

Supported on the back of the machine $a^3$, and on the tops of the compartments $a^4$, is a plate B, having a circular recess or depression in the face thereof in which is rotatably secured one or more of the coin carrying wheels C. Each of said coin carrying wheels, as shown, is provided in its periphery with a plurality of notches arranged equal distances apart and adapted to receive and carry equally well, as shown in Fig. 9, coins of any desired denomination of country in which the machine is to be used. As shown, each of said pockets or openings in the periphery of the carrying wheel is provided, (as indicated at $c$, in Fig. 2), with an inwardly beveled or chamfered portion very materially reducing the thickness of the plate as a whole and enabling the machine to carry only with certainty in each pocket a single coin, the thickness of said carrying wheel in the box being not greater than that of the thinnest coin required to be taken in operating the machine. Each of said notches, as shown, provides an outer pocket of comparatively large radius and an inner of much smaller radius. However, the shape and conformation of said pockets and the depth thereof is such that the smallest coin, that is to say, of least diameter when placed in the pocket, projects beyond the periphery of the carrying wheel. Rigidly secured on the carrying wheel and projecting through a suitable bearing or hub in the plate B, is a shaft $C'$, on the lower end of which is provided a bevel gear $c^4$, the lower or under side of which $c^5$, is notched on its under side, as shown at $c^6$, to afford a cam surface, the purpose of which is hereinafter more fully described. Journaled in the side frame member A, and on suitable bearings $d$, is a horizontal shaft D, provided on its outer end with a crank $d'$, or adapted to be rotated by a motor within the machine, which, however, is not shown. Said shaft is provided on its inner end with a beveled pinion $d^2$, which meshes with the bevel gear $c^4$, and is adapted to rotate the same. Secured on the front of said plate B, is an upwardly and outwardly extending flange E, bolted thereto and which affords therewith a hopper to receive the coins and to deliver the same to the periphery of the carrying wheel in the channel afforded therefor in the face of said plate. Covering or partly covering the face of the carrying wheel are a plurality of coin chutes, (as shown four in number, in the present instance) F—F'—$F^2$—$F^3$, inasmuch as the machine in the particular form herein shown is constructed to separate and count pennies, nickels, dimes and quarters, though, of course, coin of higher denomination may be separated and counted in which instance other chutes may be added, one for each coin. Said chutes comprise in each instance the under plate or bottom $f$, which rests at its upper edge against the face of the carrying wheel and is chamfered to a feather edge to afford no obstruction to retard the fall of the coin therethrough, and secured thereon and spaced a sufficient distance apart is the outer or cover plate $f'$, and, as shown, either of said plates may be provided with ribs $f^2$—$f^3$—$f^4$—$f^5$—$f^6$, which, as shown, space said plates a sufficient distance apart to afford an unobstructed passage for the coin and which respectively curve downwardly to direct the respective chutes to the corresponding coin trays or boxes, one for each denomination of coin in the bottom of the machine.

The counting mechanisms comprise each a counter of the Veeder or any suitable type G, the shaft $g^{10}$ of which extends through the side thereof and is provided with a gear $g$, as usual, with which meshes a pinion $g'$, on the shaft $g^2$, journaled on the under side the base plate B.

Figures 6, 7:
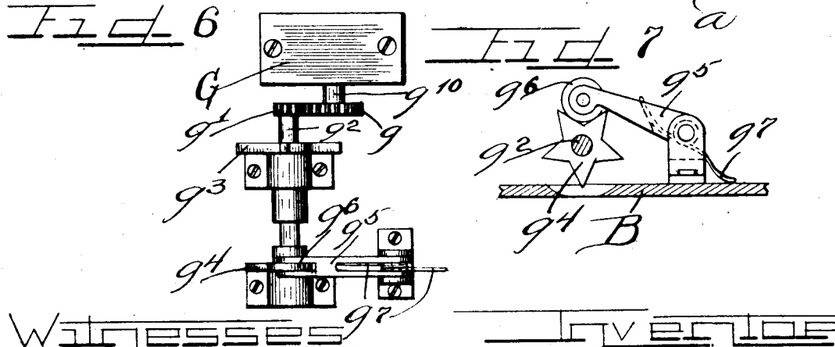
Fig. 6 is an enlarged rear elevation of the counter or register and the mechanism attached therewith for displacing the coin from the carrying wheel.
Fig. 7 is an enlarged rear elevation of the brake or stop.

Spaced opposite the respective coin chutes are slots arranged substantially at a right angle with the radius of the carrying wheel and through said slots project the arms of a "kicker" wheel $g^3$, as shown secured on a shaft $g^2$, and having five arms which are arranged obliquely with the radius so that at all times one of said arms extends upwardly through said slots approximately at a right angle with the face of the plate while the next succeeding arm lies just below the surface of the plate in position to be thrown up when a coin is carried by the carrying wheel against said projecting arm to rotate the wheel. Also secured on the shaft $g^2$, is a star wheel $g^4$, having five points, and pivotally engaged on the under side of said base plate B, is a spring pressed arm $g^5$, having an anti-friction roller or pulley $g^6$, at the end thereof which tracks on the periphery of the star wheel or cam, as shown in Fig. 7, so that when the ejector has been rotated one point by engagement of the coin therewith and the next succeeding arm is elevated or partly elevated, said roller has just passed the apex of one of the points on said star whereupon the spring $g^7$, acts to draw said arm down somewhat violently, thus giving the star wheel and ejector wheel a violent impulse sufficient to throw the coin from the pocket in the carrying wheel after which the star wheel or cam acts as a brake or stop and holds the ejector wheel in the position shown in Fig. 8, until again actuated.

As shown, a counter G—G'—$G^2$—$G^3$, is provided in position with the register thereof to be seen in the base plate B, above the carrying wheel, a counter being appropriated as before stated for each denomination of coin. As shown also, a spring impelled finger H, is pivoted in a recess in said base plate and lies in the channel affording in said base plate around the periphery of the carrying wheel and acts to displace from each pocket one of the coins should more than one find lodgment in a pocket.

Figure 2:
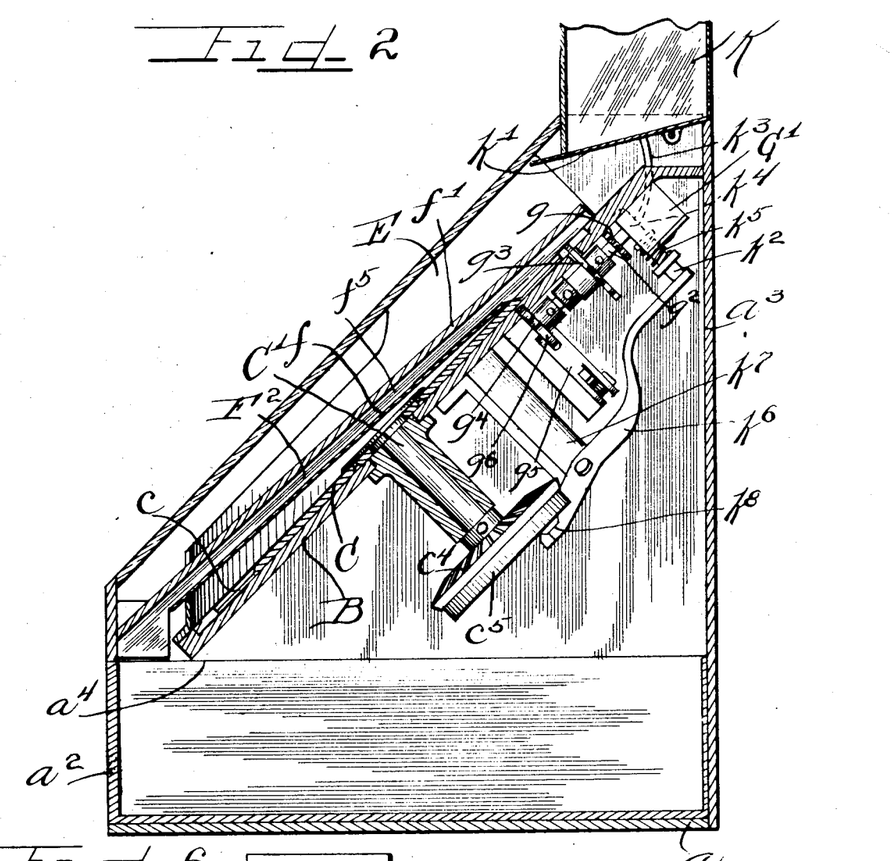
Fig. 2 is a central, vertical section taken substantially on line 2—2 of Fig. 1, and showing parts in elevation.
Figure 3:
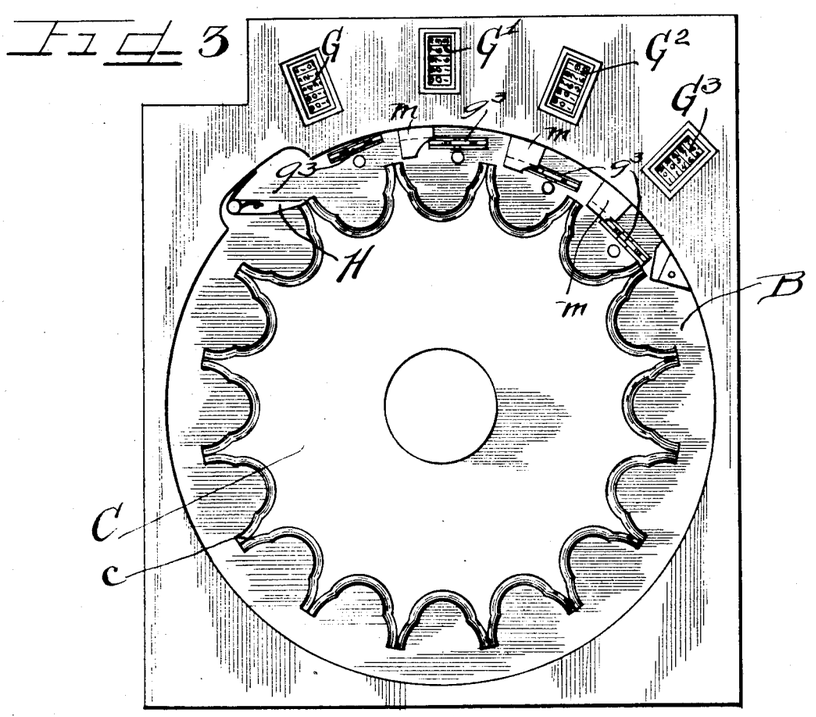
Fig. 3 is a view in front elevation of the plate, counters and carrying wheel showing the same removed from the frame.
Figure 10:
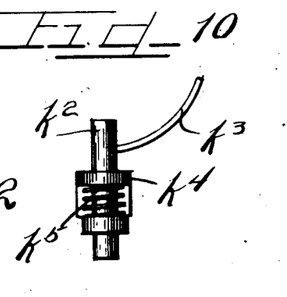
Fig. 10 is an enlarged detail of a part of the trip mechanism for the fare box.
Figure 11:
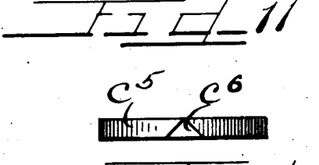
Fig. 11 is an edge view of the cam for tripping the bottom of the fare box.
Figure 12:
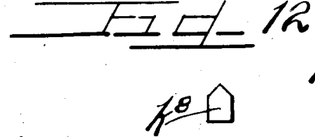
Fig. 12 is an end elevation of the lever for tripping the bottom of the fare box.
Figure 13:
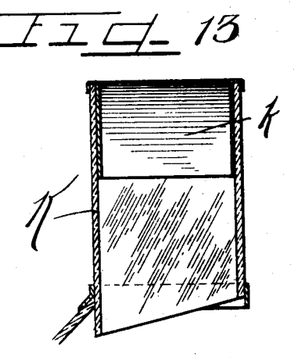
Fig. 13 is a transverse section of the receptacle into which the coin are dropped.
Figure 14:
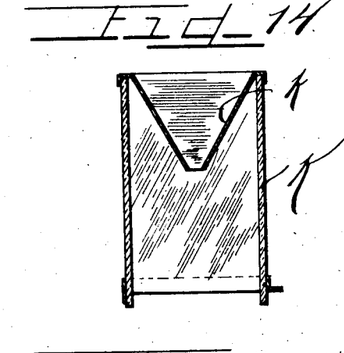
Fig. 14 is a view taken at right angles with that shown in Fig. 13.

As shown, a fare box or tray is provided on the top of the machine at one side thereof, as indicated as a whole by K. Provided in the top thereof is a hopper $k$, into which the coin may be dropped and from which they fall upon the inclined bottom $k'$, and may be readily seen by the conductor or passenger inasmuch as the sides of said fare box are constructed of glass or other transparent material. Bearing on said bottom and secured on a push pin $k^2$, is a curved arm $k^3$, slidably engaged in a suitable bearing $k^4$, secured on the base plate B, as shown in Figs. 2 and 10, and engaged against said bearing and a suitable collar is a spring $k^5$, which acts to retract said push pin to permit the bottom of the fare box to drop when the push pin is released, and as shown, a lever $k^6$, is pivoted upon a standard $k^7$, on the under side the base plate, and the end thereof $k^8$, extends into position to bear against the under side of the cam plate $c^5$, at all times. The end of said lever $k^8$, having inclined sides to fit in the notch in said cam plate to permit the outer end of the lever to be swung outwardly by means of the spring on the push pin, thus permitting the bottom of the fare box to fall immediately to be thrown in again by the opposite end of said lever emerging from said notch, thus closing the bottom.

The operation is as follows: The coin, when delivered into the fare box, at the proper time either when operated by the conductor or when operated by the motor, is discharged with the drop of the bottom of the fare box into the hopper surrounding the periphery of the carrier wheel on the lower side thereof. The coins fall into the channel therefor in the base plate B, and are taken up in the pockets in the carrying wheel and swung upwardly with the rotation thereof, any extra coin in any pocket being displaced by the finger H. As shown in Fig. 9, the shape of the pocket is such as to enable any coin of several denominations to fit in said pocket either in the inner portion or bottom thereof or in the outer portion thereof. As shown in dotted lines in Fig. 9, any of said coin when carried in the pocket projects at its periphery sufficiently beyond the periphery of the wheel to enable the same to be brought into contact with the ejector wheel $g^3$, therefor opposite its chute and as shown, said ejector wheels are arranged with reference to the size of the coin to be operated upon thereby, at a distance from the wheel varying with the diameter of the coin to be ejected. As the coin are carried upwardly by the wheel, it is obvious that a penny, dime, or nickle may pass beneath the ejector wheel $g^3$, for the quarter counter G, but should a quarter be carried upwardly by the wheel, the periphery of the quarter engages the projecting arm of the ejector wheel with the effect of partly rotating the same—at least sufficiently to enable the wheel $g^6$, to pass over the point of the star cam $g^4$, thus giving the ejector wheel a somewhat violent upward impulse and striking the quarter from its carrying wheel and into its tube through which it falls by gravity to its appropriate tray. Should the next coin in succession be one of smaller denomination, as for instance, a dime, it will pass the ejector wheels for the nickle counter G', and the penny counter $G^2$, without engaging the same, and, therefore, without registering on said registers and engaging the ejector wheel as before described, for the counter, the effect, of course, being the same as before described with reference to the quarter, the coin being ejected through the appropriate tube into the appropriate tray. In the same manner, inasmuch as the depth and shape of the pocket is such as to enable each of the coins to successively project at a different distance beyond the periphery of the carrying wheel, it follows that by properly placing the ejector wheels the respective coin may be discharged into the appropriate coin chute, each discharge, of course, rotating the Veeder shaft and counting one upon the recorder.

Secured to the base plate B, in close proximity to the carrying element and projecting over the channels of the coin at each of the counting stations are presser or guide plates $m$. These project in close proximity to the periphery of the carrying element, and are sufficiently spaced from the base plate to permit a coin to pass beneath the same, and hold the coin down past the star or kicker wheels $g^3$. Said guide plates are cut away on their rear side to immediately clear the coin after it has partially passed the star wheel and at the moment the next succeeding tooth on the star wheel rises to eject the coin.

Of course, I am well aware that the fare box may be differently placed and may be actuated in any suitable manner such as has heretofore been common with fare boxes or the same may be operated by special mechanism therefor as herein shown and described.

Of course, I do not purpose limiting this application for patent to adaptability for any particular number or denomination of coin, for clearly a much greater or a less number of denominations of coin may be successfully separated and counted by a machine of this kind, the separation of the coin economizing enormously with the labor of counting the change turned in by the conductors, and furthermore, owing to the peculiar construction herein set forth it is obvious that mistake in the count can hardly happen.

While I have described the machine as a fare register for cars, it is obvious that the same may be used for any desired purpose without departing from the principles of this invention, and I therefore purpose and desire to claim broadly any construction in which a carrying wheel is adapted to carry one or more denominations of coin in connection with means for discharging the coin from the pocket automatically. Numerous other details of construction may, of course, be varied without departing from the principles of this invention.

I claim as my invention:

1. The combination with a carrying element adapted to move any of a number of different denominations of coin singly and in succession, of mechanisms disposed along the path of travel adapted to selectively displace each coin of the same denomination from the carrying means and to count each coin so displaced simultaneously with its displacement.

2. The combination with a carrying wheel having pockets in its periphery adapted to contain one of any desired number of denominations of coin in position for the periphery thereof to project beyond the periphery of the wheel, counting mechanisms arranged around the periphery of the wheel and means for actuating said counting mechanisms disposed in the path of the moving coin and adapted to be actuated selectively each by the coin of one denomination only and when so engaged to discharge the coin from the carrying wheel.

3. The combination with a carrying element adapted to move coin of a plurality of denominations singly and in succession, of mechanisms disposed along the path of travel, each actuated by the coin of the appropriate denomination meshing therewith and adapted to selectively displace all coin of the same denomination from the carrying element, and to count each coin so displaced.

4. The combination with a carrying wheel having pockets in its periphery each adapted to contain a coin, means for automatically removing a superposed coin from any pocket counting mechanisms arranged around the periphery of the wheel, each appropriated to a single denomination of coin, and independent means, one appropriated to each denomination of coin and adapted to be actuated selectively by each coin of the denomination to which appropriated and when actuated adapted to count the coin and then discharge the same from the pocket.

5. The combination with a carrying element adapted to move coin of a plurality of denominations singly and in succession, of mechanisms disposed along the path of travel, each actuated by the coin of the appropriate denomination meshing therewith and adapted to selectively displace all coin of the same denomination from the carrying element and to count each coin so displaced, an independent passage for receiving each denomination of coin displaced and an independent receptacle for receiving all coin of the same denomination from the respective passage.

6. In a machine of the class described a carrying wheel having pockets in its periphery adapted to receive singly any one of a number of different denominations of coins with the periphery of the coin projecting beyond the periphery of the wheel, said pockets being so formed as to permit coin of different diameter to project beyond the periphery of the wheel at different distances other than the difference in the diameters of the coin.

7. In a machine of the class described a rotative carrying wheel having relatively shallow pockets in its periphery, the depth thereof being such that the smallest denomination of coin to be counted will project beyond the periphery of the wheel and inwardly projecting shoulders on each side of the pocket adapted to exaggerate the projection of the coins beyond the periphery of the wheel due to the differences of diameter of the respective coins, said wheel at each pocket being chamfered or reduced in thickness to correspond approximately with the thickness of the thinnest coin to be counted.

8. In a machine of the class described a carrying wheel having pockets in its periphery adapted to receive any of a number of different denominations of coins with the periphery of the coin projecting beyond the periphery of the wheel, said pockets being so formed as to permit coin of different diameter to project different distances beyond the periphery of the wheel and the edges of the metal around the pockets being reduced in diameter to correspond with the thickness of the thinnest coin, and means for removing all coins more than one carried in any pocket.

9. In a machine of the class described, a rotative carrying wheel having pockets in its periphery, inwardly projecting shoulders on each side of the pocket adapted to permit the smaller denominations of coin to extend fully into the pocket and to prevent the larger denomination of coin from extending fully into the pocket, said wheel at each pocket being chamfered or reduced in thickness to correspond approximately with the thickness of the thinnest coin to be counted, means for removing a superposed coin from any pocket and means for counting the indiscriminately mixed coin as the wheel is rotated.

10. In a machine of the class described a carrying wheel having pockets opening into its periphery, projections on the walls of said pockets, said pockets adapted to receive any of a number of different denominations of coins with the periphery of the coin projecting beyond the periphery of the wheel, said pockets being so formed as to permit coin of different diameter to project different distances beyond the periphery of the wheel, and counting mechanisms adapted to count the coins carried in the pockets.

11. In a machine of the class described a carrying wheel having pockets in its periphery adapted to receive any of a number of different denominations of coins with the periphery of the coin projecting beyond the periphery of the wheel, said pockets being so formed as to permit coin of different diameter to project different distances beyond the periphery of the wheel, counting mechanisms adapted to count the coins carried in the pockets, and means adapted to quickly snap a part of the counting mechanism to throw the coins over the wheel from the pockets.

12. In a machine of the class described a rotatable carrying element having pockets in its periphery, each adapted to receive and carry but a single coin of any of the denominations to be counted, means for rotating the wheel, a plurality of counters positioned around the periphery of the wheel at the top thereof and adjusted at different radial distances and means for actuating said counters by meshing of the coin of a single denomination for each counter therewith, said actuating means acting to trip the coin from the pocket when counting and a coin tube for each counter adapted to separately deliver the coin when counted to a place of deposit.

13. A machine of the class described embracing a combined rotative separating and counting mechanism for coin of different denominations, a receptacle positioned above the same, a tilting bottom therein adapted to support the coin therein in plain view after deposit, mechanism acting conjointly with a part of the counting mechanism for dropping the bottom of the receptacle to discharge the coin to the counting mechanisms and immediately restoring said bottom to receive succeeding coins.

14. In a machine of the class described a rotatable inclined carrying element having pockets in its periphery, means for rotating the wheel, a plurality of counters positioned around the periphery of the wheel at the top thereof, counter actuating mechanism adapted to be actuated by coin of the appropriate size and a coin tube for each counter adapted to deliver the coin when counted to a place of deposit.

15. A machine of the class described embracing a combined rotative separating and counting mechanism for coin of different denominations, a receptacle positioned above the same, a tilting bottom therein adapted to support the coin in plain view after deposit, mechanism for tilting the bottom once for each rotation of the separating mechanism to open the receptacle to discharge the coin to the counting mechanisms and mechanism for discharging the coin from the separating mechanism adapting the coin to deposit by gravity.

16. In a device of the class described, a receptacle adapted to receive and exhibit deposited coin, separating and counting mechanisms positioned below the receptacle, means for operating the same embracing a rotative shaft, mechanism operated from said shaft for discharging the contents of the receptacle to the counting mechanism and means operated by the coins for simultaneously actuating the counter mechanism and discharging the coins from the separating mechanism.

17. A separating and counting machine for coin embracing a rotative carrying wheel adapted to carry any of the denominations of coin to be counted one by one, counting mechanisms disposed along the path of travel of the coin at different distances from the periphery of the wheel, one for each denomination of coin and means operated by the moving coin for simultaneously actuating the register and discharging the coin from the carrier.

18. In a device of the class described a receptacle adapted to receive indiscriminately mixed coin, a counter for each denomination of coin, and a single movable carrying element acting to convey all of the coins of the several denominations into engagement with their respective counters.

19. A separating and counting machine for coin embracing a rotative carrying element adapted to carry any of the denominations of coin to be counted, means for preventing more than one layer of coin being carried by the carrying element at the same time, counting mechanisms disposed along the path of travel of the coin, one for each denomination of coin, means operated by the moving coin for simultaneously actuating the counter and discharging the coin from the carrier and a receptacle for each denomination of coin to which the same are discharged after counting.

20. A machine of the class described embracing an inclined rotatable carrying wheel having pockets in its periphery, each adapted to receive but a single coin of any denomination to be counted, counting mechanism arranged around the periphery of the wheel at graduated distances one for each denomination of coin, a ratchet wheel for each counter positioned to be engaged only by the coin of the denomination to be counted on that counter, and connected to operate the counter and tripping means adapted to actuate the ratchet wheel to strike the coin counted from the carrying element.

21. A machine of the class described embracing an inclined support provided with a recess, an inclined rotatable carrying wheel in said recess having pockets in its periphery adapted to receive coins therein, means for actuating the carrying wheel to move the coins upward on the inclined support, counting mechanisms arranged above the carrying wheel, a ratchet wheel for actuating each counter adapted also to strike the coin from the pockets and independent passages for receiving each denomination of coin.

22. A machine of the class described embracing an inclined carrying wheel provided with closely arranged peripheral pockets opening through the periphery thereof, having a depth less than the diameter of the smallest coin to be counted, inwardly projecting shoulders in the pocket acting to separate coin of larger diameter on the bottom of the pocket, counting mechanisms arranged adjacent the wheel, a ratchet connected with each counting mechanism projecting into the path of the coin to be counted, said ratchets for the respective counting mechanism being arranged successively nearer the periphery of the carrying wheel in the direction of rotation thereof, said ratchet wheels acting when engaged by the coin to actuate the counting mechanism and to simultaneously strike the coin from the pocket.

23. In a device of the class described an inclined support, means around the lower side of the support forming a receptacle to hold coins, a carrying element adapted to selectively advance the coin from the receptacle, a plurality of inclined passages extending across the face of the carrying element, and independent means for releasing all coins of the same denomination from the carrying element and delivering the same into one of the passages.

24. In a device of the class described a receptacle adapted to receive indiscriminately mixed coins, a counter for each denomination of coin, a single carrying element acting to convey all of the coins of the several denominations to their respective counters, and means connected with the counters adapted to be actuated by the moving coins to simultaneously actuate the counting mechanism and discharge the moving coin from the carrying element.

25. In a device of the class described an inclined support, means around the lower side of the support forming a receptacle to hold coins, a carrying element adapted to selectively advance the coin from the receptacle, a plurality of inclined passages extending across the face of the carrying element, independent means for releasing all coins of the same denomination from the carrying element and delivering the same into one of the passages, a plurality of compartments, each adapted to receive the coin from one passage only, and mechanism operated by the coins for independently counting each denomination of coins delivered into the respective compartment simultaneously with their release from the carrying element.

26. A machine of the class described embracing an inclined carrying wheel provided with closely arranged peripheral pockets opening through the periphery thereof, having a depth less than the diameter of the smallest coin to be counted, counting mechanisms arranged along the top of the wheel, means connected with each registering mechanism projecting into the path of the coin to be counted, and acting when engaged by the coin to actuate the counting mechanism appropriated thereto, said means adapted to simultaneously strike the coin from the pocket, and a spring brake acting to limit the rotation of said counting mechanism.

27. A machine of the class described embracing an inclined carrying wheel provided with closely arranged peripheral pockets, adapted each to carry a coin therein, means advancing the wheel to elevate the coins, counting mechanisms, independent means for each denomination of coin adapted to simultaneously actuate the counting mechanism for the coins of the respective denominations and eject the same from the carrying wheel, and an independent receptacle for receiving each denomination of coin.

28. A machine of the class described embracing an inclined carrying wheel provided with closely arranged peripheral pockets, adapted each to carry a coin therein, means advancing the wheel to elevate the coins, means adapted to force the coins out of the pockets permitting the coins to fall by gravity, an independent receptacle for receiving each denomination of coin, counters, each counting the coins of one denomination only, and means adapted to accelerate the movement of the means for removing the coins from the pockets to positively and quickly displace the coins.

29. A machine of the class described embracing an inclined carrying wheel provided with closely arranged peripheral pockets, adapted each to carry a coin therein, means advancing the wheel to elevate the coins, means adapted to force the coins out of the pockets permitting the coins to fall by gravity, an independent receptacle for receiving each denomination of coin, counters each counting the coins of one denomination only, means adapted to accelerate the movement of the means for removing the coins from the pockets to positively and quickly displace the coins, and mechanism adapted to automatically feed the coins to the carrying wheel.

30. A coin counting mechanism embracing a single rotative carrying wheel, means for rotating the same, pockets to receive the coin singly of any of the denominations to be counted, counters arranged along the periphery of the wheel at distances therefrom, varying with the coin to be counted, and adapted to be actuated selectively by the coin in the order of their size from the larger to the smaller, and a receptacle adapted to be automatically dumped to the counting mechanisms by the rotation of said wheel.

31. A coin counting mechanism embracing a single rotative carrying wheel, means for rotating the same, pockets to receive the coin singly of any of the denominations to be counted, counters arranged along the periphery of the wheel and adapted to be actuated selectively by the coin in the order of their size from the larger to the smaller, means for forcing the coins from the carrying wheel to discharge the counted coin and means for receiving each denomination of coin.

32. In a device of the class described a carrying element provided with pockets adapted to receive coins of different denominations therein, passages adapted to receive all the coins of the same denomination, and discharge means for elevating all the coins from the carrier and delivering the same to the respective denominational passage.

33. In a device of the class described a carrying element provided with pockets each adapted to receive one coin from a mass of indiscriminately mixed coins and to remove the coin from the mass, mechanism for striking a face of the coin to eject the same from the pockets and passages, each adapted to receive all the coin of one denomination only.

34. In a device of the class described a disk having apertures opening into the periphery thereof adapted to select a coin from a mixture of different denominations and carry the coin securely nested in one of said apertures, mechanism adapted to project above the apertures and strike the coin therefrom, passages to receive the ejected coin and means for counting the coins.

35. In a machine of the class described a carrying element having pockets, each adapted to receive any sized coin within the capacity of the machine, coin actuated pivoted means for striking the coin from each pocket adapting the same to fall by gravity and an independent receptacle into each of which all the coins of the same denomination are deposited.

36. In a machine of the class described a carrying element having pockets, each adapted to receive any sized coin within the capacity of the machine, means striking the coin on the inner face to remove the same from each pocket adapting the same to fall by gravity, an independent receptacle into each of which all the coins of the same denomination are deposited, and mechanism for intermittently delivering indiscriminate coins to the carrying element.

37. In a machine of the class described a carrying element having pockets, each adapted to receive any sized coin within the capacity of the machine, positively rotated means for forcing the coin from each pocket adapting the same to fall by gravity, independent receptacles into each of which all the coins of the same denomination are deposited, and counting mechanism for selectively counting the coins.

38. In a device of the class described an apertured disk adapted to carry different denominations of coin in said apertures with each coin projecting beyond the periphery of the disk and independent counters for each denomination of coin actuated by each coin of the proper denomination while carried by said element.

39. In a device of the class described a wheel having pockets adapted to carry indiscriminately mixed coins and independent counting mechanisms, each actuated by all the coin of one denomination carried by said wheel.

40. In a device of the class described a wheel having pockets adapted to carry indiscriminately mixed coins, independent counting mechanisms, each actuated by all the coin of one denomination carried by said wheel, and each counting mechanism adapted to remove the coin of its denomination from the pockets after the coin are counted.

41. In a device of the class described a wheel having pockets adapted to carry indiscriminately mixed coins, independent counting mechanisms, each actuated by all the coin of one denomination carried by said wheel, each counting mechanism adapted to remove the coin of its denomination from the pockets after the coin are counted, and a spring brake for each registering mechanism.

42. In a device of the class described a carrying wheel having peripheral pockets adapted to receive coins of different denominations and independent counting mechanisms positioned different distances from the periphery of the wheel, each adapted to be actuated by the coin of one denomination only.

43. In a device of the class described a carrying wheel having peripheral pockets adapted to receive coins of different denominations, independent counting mechanisms positioned different distances from the periphery of the wheel, each adapted to be actuated by the coin of one denomination, and independent means for giving a rapid impulse to each counting mechanism to throw the coins out of the pockets after counting thereof.

44. In a device of the class described a plate, a carrying wheel rotatable thereon adapted to carry indiscriminately mixed coins with a portion thereof projecting outwardly from the wheel, counters for the different denominations of coins and members, one for operating each counter projecting through the plate at different distances from the carrying wheel to be actuated by all the coins of the respective denomination.

45. In a device of the class described an inclined plate, a rotatable carrying wheel movable thereover, counters secured to the inclined plate and actuating mechanism for the counters secured to the inclined plate and positioned different distances from the carrying wheel.

46. In a device of the class described an inclined plate, a carrying wheel having pockets in its periphery, counting mechanisms, toothed wheels, one connected to actuate each counting mechanism and said toothed wheels positioned different distances from the carrying wheel to be selectively operated by the coins of different denominations.

47. In a device of the class described a carrying wheel having pockets in its periphery, toothed wheels positioned adjacent the periphery of the carrying wheel and at different distances therefrom, and counting mechanisms connected with the toothed wheels to be operated by rotation thereof.

48. In a device of the class described an inclined receptacle, a rotary carrying element for indiscriminately mixed coins and counters arranged at different distances from the carrying element adapted to count the coins carried by said element.

49. In a device of the class described a carrying wheel having peripheral pockets to receive coins therein, counters, and a transferring mechanism for each counter comprising a shaft, intermeshing gears on said shaft and the counter shaft, and a toothed wheel on each shaft, said teeth being shaped on one side to be engaged by the coin and on the opposite side to elevate the coins from the pockets.

50. In a device of the class described a carrying wheel having peripheral pockets to receive coins therein, counters and a transferring mechanism for each register comprising a shaft, intermeshing gears on said shaft and the counter shaft, a toothed wheel on each shaft, said teeth being shaped on one side to be engaged by the coin and on the opposite side to elevate the coins from the pockets, and a brake mechanism for each toothed wheel adapted to give a quick impulse thereto in discharging the coin from the pockets.

51. In a device of the class described a carrying element, a counter, a counter shaft, an actuating shaft, intermeshing gears on said shafts, and a wheel on said actuating shaft having teeth adapted to be engaged by the articles carried by the carrying element to simultaneously actuate the counter and eject the coins from the carrying element.

52. In a device of the class described a carrying element, a counter, an actuating shaft, a wheel on said actuating shaft having teeth adapted to be engaged by the articles carried by the carrying element to actuate the counter, said wheel adapted also to discharge the articles from the carrying element.

53. In a device of the class described a carrying element, a counter, a counter shaft, an actuating shaft, intermeshing gears on said shafts, a wheel on said actuating shaft having teeth adapted to be engaged by the articles carried by the carrying element, said wheel adapted also to discharge the articles from the carrying element, a toothed wheel on said actuating shaft, and a spring pressed anti-friction brake member adapted to engage said toothed wheel to limit the movement of the shaft for each actuation.

54. In a device of the class described a carrying member for indiscriminately mixed coins, and a counting mechanism for each denomination of coin comprising a counter, a wheel provided with teeth shaped to be engaged and rotated by the coins, and each tooth shaped to release the coins from the carrying element, and means connecting the counter and wheel to actuate the counter when the wheel is rotated by each coin.

55. In a device of the class described a carrying element for coins, a counter and a wheel having teeth adapted to be engaged by the coins and each successive tooth after the tooth engaged by the coin shaped to remove the coins from the carrying element after the coins have actuated the wheel.

56. In a device of the class described a casing, a hopper therein, a receptacle adapted to deliver into the hopper, a bottom pivoted to close the receptacle, a lever pivoted to hold the bottom closed, means for releasing the lever to permit the bottom opening, a carrying wheel in the casing having one end rotatable in the hopper, and counters adapted to be actuated by the coin carried by the carrying wheel.

57. In a device of the class described a casing, a receptacle opening thereinto, a hopper adapted to receive the coin from the receptacle, a bottom hinged to the receptacle, means for normally holding the bottom closed, counting mechanism for the coins, a rotatable element for carrying the coins to actuate the counting mechanism and mechanism for actuating the rotatable element and the means for normally holding the bottom closed.

58. A machine of the class described embracing a carrying element having pockets, each adapted to receive a single coin, a counting mechanism for each denomination of coin, actuating means for each counter of coin positioned to be engaged only by the coin of the denomination to be counted on that counter, and connected to operate the counter and means adapted to upwardly eject the coin counted from the carrying element as it is counted.

59. A machine of the class described embracing a carrying wheel having pockets in its periphery, counting mechanism arranged around the periphery of the wheel at graduated distances, one for each denomination of coin, and actuating means for each counter positioned to be engaged only by the coin of the denomination to be counted on that counter.

60. A coin counting mechanism embracing a single carrying element, pockets to receive the coin singly of any of the denominations to be counted, counters adapted to be actuated selectively by the coin in the order of their size, means for forcing the coins from the carrying wheel simultaneously with the register of the count, and means for receiving each denomination of coin after they have been counted.

61. A machine of the class described embracing a carrying element, having pockets each adapted to receive but a single coin of any denomination to be counted, counting mechanism arranged around the carrying element at graduated distances one for each denomination of coin, actuating means for each counter positioned to be engaged only by the coin of the denomination to be counted on that counter, and connected simultaneously to operate the counter to eject the coin counted from the carrying element.

62. A coin counting mechanism embracing a selective carrying disk rotatable about its center, pockets to receive the coin singly of any of the denominations to be counted, and counters, adapted to be actuated by the coin while moving with the selective carrying element.

63. A machine of the class described embracing an element provided with closely arranged peripheral pockets, adapted each to carry a coin therein, means adapted to force the coins out of the pockets, an independent receptacle for receiving each denomination of coin, means adapted to accelerate the movement of the means for removing the coins from the pockets to positively and quickly displace the coins, and mechanism adapted to automatically feed the coins to the carrying element.

64. A machine of the class described embracing an inclined element provided with pockets, adapted each to carry a coin therein, means adapted to force the coins out of the pockets, an independent receptacle for receiving each denomination of coins, counters each counting the coins of one denomination only, and means adapted to accelerate the movement of the means for removing the coins from the pockets to positively and quickly displace the coins.

65. In a device for counting indiscriminately mixed coins, counters each adapted to count the coins of one denomination and a single pick up carrying element rotatable in a constant plane adapted to convey all of the coins of the several denominations to their respective counters.

66. In a device of the class described a casing, a hopper therein, a receptacle adapted to deliver indiscriminately mixed coin into the hopper, a bottom pivoted to close the receptacle, means adapted to permit the opening of the bottom, a rotatable carrying wheel adapted to carry the different denominations of coin with each coin projecting beyond the periphery thereof, mechanism disposed along the path of travel, each actuated by the coin of the appropriate denomination meshing therewith and adapted to selectively displace all coin of the same denomination from the carrying wheel, and to count each coin so displaced, a plurality of inclined passages extending across the face of the carrying element adapted to receive the coins of the respective denominations as they are displaced and a plurality of compartments each adapted to receive the coin from one passage only.

67. In a device of the class described a casing, a hopper therein, a receptacle adapted to deliver indiscriminately mixed coin into the hopper, a carrying element adapted to carry the different denominations of coin, and mechanism disposed along the path of travel, each actuated by the coin of the appropriate denomination meshing therewith and adapted to selectively displace all coin of the same denomination from the carrying element, and to count each coin so displaced.

68. In a device of the class described a casing, a hopper therein, a receptacle adapted to deliver indiscriminately mixed coin into the hopper, a carrying element adapted to convey the different denominations of coin from the hopper, mechanism disposed along the path of travel, each actuated by the coin of the appropriate denomination meshing therewith and adapted to selectively displace all coin of the same denomination from the carrying wheel, and to count each coin so displaced, and means adapted to accelerate the movement of said mechanism for removing the coins from the carrying element to positively displace the coins.

69. In a device of the class described a casing, a hopper therein, means adapted to deliver indiscriminately mixed coin into the hopper, a carrying wheel adapted to convey the different denominations of coin from said hopper, mechanism disposed along the path of travel, each actuated by the coin of the appropriate denomination of coin and adapted to selectively displace all coin of the same denomination from the carrying wheel, and to count each coin so displaced, means adapted to accelerate the movement of the mechanism for displacing the coins, passages extending across the face of the carrying element adapted to receive the coins of the respective denominations as they are displaced and a plurality of compartments each adapted to receive the coin from one passage only.

70. In a device of the class described a carrying element adapted to convey different denominations of coin, mechanism disposed along the path of travel of said carrying element, each actuated by the coin of the appropriate denomination and adapted to selectively displace all coin of the same denomination from the carrying wheel, and to count each coin so displaced, means adapted to accelerate the movement of the mechanisms for displacing the coin, and passages extending across the face of the carrying element adapted to receive the coins of the respective denominations as they are displaced.

71. In a device of the class described a hopper, a receptacle adapted to deliver indiscriminately mixed coin into the hopper, a bottom pivoted to close the receptacle, an element adapted to carry different denominations of coin, a shaft secured on said carrying element, a bevel gear on the end of said shaft, a cam plate on the under side thereof, a shaft extending through said casing, a gear thereon adapted to mesh with said beveled gear to actuate the carrying element, a curved arm bearing upon the bottom of said receptacle, a push pin connected with said curved arm, and a lever pivoted in said casing having one end thereof adapted to contact said cam plate to permit the other end to swing outwardly to permit the bottom of the receptacle to open to deliver coins to the hopper.

72. In a device of the class described, a hopper, a receptacle adapted to deliver indiscriminately mixed coin into the hopper, a bottom adapted to close the receptacle, an element adapted to carry different denominations of coin, a shaft secured on said carrying element, connections adapted to actuate said shaft and carrying element, a cam plate, a pivoted lever having one end thereof adapted to contact said cam plate to permit the other end to swing to permit the bottom of the receptacle to open to deliver the coin to the hopper, mechanism disposed along the path of travel of the carrying element and at varying distances therefrom, each actuated by the moving coin of the appropriate denomination and adapted to selectively displace all coin of the same denomination from the carrying element to count each coin simultaneously with its displacement, means adapted to accelerate the movement of the coin displacing means, a plurality of inclined passages extending across and above the face of the carrying element adapted to receive the coins of the respective denominations as they are displaced, and a plurality of compartments each adapted to receive the coin from one passage only.

73. In a device of the class described a hopper, a receptacle adapted to deliver indiscriminately mixed coin into the hopper, a bottom adapted to close the receptacle, an element adapted to carry different denominations of coin, a shaft secured on said carrying element, means connected with said shaft to actuate the carrying element, a cam plate on said shaft, a pivoted lever having one end thereof adapted to contact said cam plate to permit the other end to swing to permit the bottom of the receptacle to open to deliver the coins from the receptacle to the hopper, mechanism disposed along the path of travel of the carrying element, each actuated by the moving coin of the appropriate denomination and adapted to selectively displace all coin of the same denomination from the carrying element and to count each coin simultaneously with its displacement.

74. In a device of the class described a hopper, a receptacle adapted to deliver indiscriminately mixed coin into the hopper, a bottom adapted to close the receptacle, an element adapted to carry different denominations of coin, means adapted to be intermittently actuated to permit the bottom of the receptacle to open to deliver the coin to the hopper, mechanism disposed along the path of travel of the carrying element, each actuated by the moving coin of the appropriate denomination and adapted to selectively displace all coin of the same denomination from the carrying element, and to count each coin simultaneously with its displacement, means adapted to accelerate the movement of the coin displacing means and a plurality of passages extending across and above the face of the carrying element adapted to receive the coins of the respective denominations as they are displaced.

75. In a device of the class described a hopper, a receptacle adapted to deliver indiscriminately mixed coin into the hopper, a bottom adapted to close the receptacle, an element adapted to carry different denominations of coin, a shaft secured on said carrying element, a cam plate on said shaft, means connected with said shaft to actuate the carrying element, means adapted to bear against the cam plate to permit the bottom of the receptacle to be opened intermittently to deliver coin to the hopper, mechanism disposed along the path of travel of the carrying element and at varying distances therefrom, each actuated by the moving coin of the appropriate denomination and adapted to selectively displace all coin of the same denomination from the carrying element and to count each coin simultaneously with its displacement passages adapted to receive the coins of the respective denominations as they are displaced, and compartments each adapted to receive the coin from one passage only.

76. In a device of the class described a hopper, a receptacle adapted to deliver indiscriminately mixed coin into the hopper, a bottom adapted to close the receptacle, an element adapted to carry different denominations of coin, a shaft secured on said carrying element, a cam plate on said shaft, means connected to actuate said carrying element, and means adapted to bear against said cam to permit the bottom of the receptacle to be opened intermittently to deliver coin to the hopper.

77. In a device of the class described, a hopper, a receptacle adapted to deliver into the hopper, an element adapted to carry different denominations of coin, mechanism disposed along the path of travel of the carrying element actuated by the moving coin and adapted to displace all coin from the carrying element, and means adapted to accelerate the movement of the coin displacing means.

78. In a device of the class described a hopper, a receptacle adapted to deliver indiscriminately mixed coin into the hopper, an element adapted to carry different denominations of coin, mechanism disposed along the path of travel of the carrying element and at varying distances therefrom, each actuated by the moving coin of the appropriate denomination and adapted to selectively displace all coin of the same denomination from the carrying element, means adapted to accelerate the movement of the means for displacing the coins, passages adapted to receive the coins of the respective denominations as they are displaced, and compartments each adapted to receive the coin from one passage only.

79. In a device of the class described a hopper, a receptacle adapted to deliver indiscriminately mixed coin into the hopper, an element adapted to carry different denominations of coin, each actuated by the moving coin of the appropriate denomination and adapted to selectively displace all coin of the same denomination from the carrying element, means adapted to accelerate the movement of the coin displacing means and compartments adapted to receive the coin of one denomination only.

80. A machine of the class described comprising an inclined peripherally notched disk adapted to carry varied size coins, a notched wheel adapted to be actuated by a coin and serving to eject the same from said disk simultaneously, and means causing said notched wheel to strike said coin abruptly and snap said wheel into position for the next coin.

81. A machine of the class described comprising a disk for carrying coins, and a plurality of coin counting mechanisms adapted to be actuated by the coin while the same are being carried by said disk.

82. A machine of the class described embracing a coin carrying disk, and an integral counting and ejecting element adapted to be actuated by a coin while carried on said disk.

83. A machine of the class described embracing a coin carrying disk and coin counting and ejecting mechanism mounted without the periphery thereof, adapted to be thrown into operation by the coin while carried by said disk.

84. A machine of the class described embracing a rotatable coin carrying element, coin passages above said element and means for counting and projecting said coins upwardly into the respective passages.

85. A machine of the class described comprising a rotatable coin carrying wheel, selective mechanism adapted to be respectively actuated by coin of different diameter while said coins are in engagement with said wheel, counting means connected to said mechanisms, and means adjacent the face of said wheel to receive the counted coin.

86. A machine of the class described comprising a rotatable disk, means on said disk for picking up and carrying coin of various denomination, a stripper projecting over said disk, a cam actuated by said coin on the disk to effect the proper counting of the same, and means inclined over the face of said disk to receive the counted coin.

87. A machine of the class described comprsing a rotatable disk, means thereon for carry coins, a notched cam pivoted at the upper side of said disk and adapted to be actuated by contact with the periphery of a coin counting mechanism thrown into operation thereby, and means receiving the counted coin from the disk.

88. In a machine of the class described, a rotatable disk for carrying coins of different denominations upwardly to counting position, counting means normally at rest, and connections effected by the coins on said disk for selectively bringing the counting means into operation.

89. In a machine of the class described an inclined rotatable disk, means thereon for carrying coins, counting mechanism, and a spring controlled notched cam adapted to be actuated by the coin as the same is thrust along by said disk, said counting mechanism selectively brought into operation by means of said coin.

90. In a machine of the class described driving mechanism therefor, a coin carrying disk connected thereto carrying coins of different denominations, counting mechanism normally at rest and means selectively effected by the coin to bring said counting mechanism and said driving mechanism into connected relation to count the coin.

91. A fare register adapted to receive an indiscriminate mass of coins of various denominations, a rotatable disk for carrying the coins, a plurality of register mechanisms normally at rest and adapted to be driven by coins of certain denomination carried on said disk, registers connected thereto to register the number of coins collected, and sorting means for the coins afforded by said registering mechanisms.

92. A mechanism of the class described embracing a carrying element for indiscriminately mixed coins, register actuating mechanisms arranged peripherally around the same, a wheel affording a part of each and projecting into the path of a coin of certain denomination on the carrying element to be selectively engaged and rotated by said coin to simultaneously actuate the respective register actuating mechanisms, and discharge the coin from the carrying element.

93. A machine of the class described embracing a carrying element, a hopper to receive the coins mixed, register actuating mechanisms arranged around the carrying element, a star wheel for each register actuating mechanism projecting into the path of the moving coins at varying distances from the carrier dependent upon the denomination to be counted, a presser plate arranged to hold the coin down while actuating the register actuating mechanisms, and to release the same with the rise of the next succeeding tooth, whereby the coin are discharged from the carrying element.

94. In a device of the class described a carrying member for indiscriminately mixed coins, integral registering and sorting mechanisms operated by the respective denomination of coins on said carrying member for simultaneously registering and sorting the coins of all denominations.

95. In a device of the class described a toothed wheel positioned to be actuated by engagement of a moving coin with one of its teeth, and to actuate a register, and the succeeding tooth on said wheel acting to eject the coin to a place of deposit.

96. In a device of the class described a coin carrying element adapted simultaneously to elevate coins of different denominations in the same path to counting position, counting means actuated by the coins on said element in accordance with the denomination of the coin, and means projecting over said carrying element to maintain the coin in place during the counting operation thereof, and permitting ejectment of the coin after the same has been counted.

97. In a device of the class described an apertured stationary support for the coins, mechanism moving thereover adapted to slide the coins of different denominations in the same path thereon, means intermittently actuated through said aperture, and registering mechanism acting to count a coin when a proper coin is moved into contact with said means.

98. In a device of the class described a stationary element, means moving thereover acting to sweep coins of different denominations in the same path thereon, and mechanism acting to register the coins moved around on said stationary member.

99. In a device of the class described a stationary element, means rotating over the surface thereof to sweep coins of different denominations in the same path thereon, a projecting element adapted to be contacted by a coin during its movement on said stationary element to effect registration of the coin, and a chute to receive the ejected coins from said stationary element.

100. In a device of the class described a stationary element, means moving thereover acting to move the coins of different denominations in the same path thereon, and intermittently actuable mechanism adapted to be selectively actuated by contact with the coins so moved to cause a proper registration of the coins moved on the stationary element.

101. In a device of the class described a stationary element, means rotating over the surface thereof to move coins of different denominations in the same path thereon, intermittently actuable projecting mechanism adapted to be contacted by a coin during its movement on said stationary element to effect registration of the coin, and a chute to receive the ejected coins from said stationary element.

In testimony whereof I have hereunto subscribed my name in the presence of two subscribing witnesses.

JAY M. JOHNSON.

Witnesses:
LAWRENCE REIBSTEIN,
K. E. HANNAH.